Oct. 7, 1969
M. D. W. ADLER ET AL
3,471,279
METHOD FOR SEALING ANODE BUTTONS IN GLASS CATHODE RAY
TUBE FUNNEL PORTIONS
Filed Sept. 13, 1967
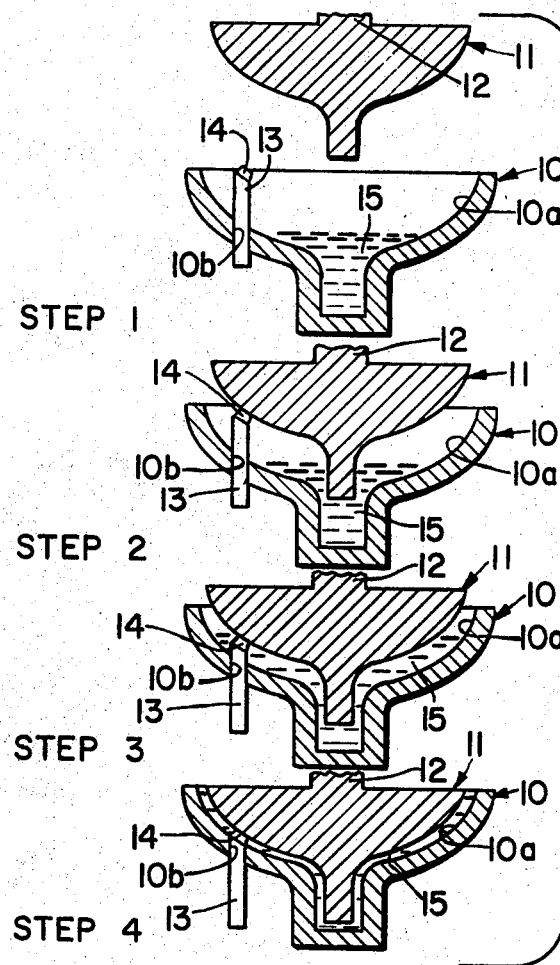
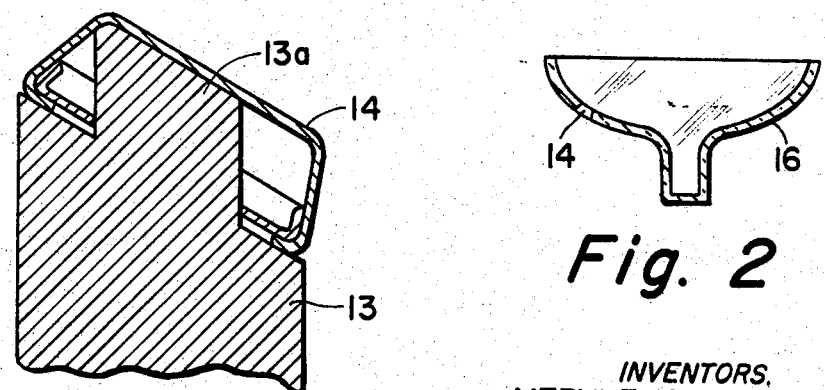
INVENTORS,
MERYLE D.W. ADLER
LAWRENCE A. PAULS
BY
Charles W. Gregg
AGENT

United States Patent Office 3,471,279
Patented Oct. 7, 1969

3,471,279
METHOD FOR SEALING ANODE BUTTONS IN GLASS CATHODE RAY TUBE FUNNEL PORTIONS
Meryle D. W. Adler, Painted Post, and Lawrence A. Pauls, Horseheads, N.Y., assignors to Corning Glass Works, Corning, N.Y., a corporation of New York
Filed Sept. 13, 1967, Ser. No. 667,539
Int. Cl. C03b 9/44
U.S. Cl. 65—49        4 Claims

ABSTRACT OF THE DISCLOSURE

A method of sealing an anode button in the funnel portion of a glass cathode ray tube during the press forming of such portion from a gob of molten glass, such method employing a mandrel extending vertically through the press forming mold and movable into and out of the cavity of such mold and said anode button being supported upon the upper end of said mandrel prior to said press forming. The pressing plunger contacts the upper end of said button and moves the button and mandrel downwardly during a first part of the press forming of a gob of molten glass previously supplied to said mold cavity and, during a later part of such press forming, presses said molten glass into intimate contact with the peripheral surface of said anode button to provide hermetic seal between said surface and the surrounding glass.

Background of the invention

The present invention relates to glass cathode ray tubes and, more particularly, to funnel portions of such tubes. Still more specifically the invention relates to a method of forming said funnel portions and, simultaneously with such forming, sealing the usual and conventional type anode button in each formed funnel portion.

Usually, funnel portions of glass cathode ray tubes or tube envelopes are formed and the wall of each such portion is pierced, usually subsequent to said forming, to provide an opening extending through such wall for receipt therein of an anode button. The anode buttons are then inserted in such openings and sealed therein by a suitable glass to metal seal. Such steps of providing anode buttons in the funnel portions are relatively time consuming and, of course, add to the overall cost of fabricating glass cathode ray tubes or tube envelopes. Accordingly, the method of the present invention was developed to provide an economically more efficient manner of sealing anode buttons in the funnel portions of glass cathode ray tubes or tube envelopes.

Summary of the invention

In practicing the invention there is provided a press forming mold member and a cooperative overlying pressing plunger member, said mold member embodying a hole extending substantially vertically through such mold member and opening into the forming cavity of the mold member. A mandrel extends snugly through said hole and for a distance upwardly into said mold cavity, such mandrel being resistively vertically slidable within said hole and the upper end of the mandrel having a configuration such as to support the usual anode button substantially in the attitude at which such button is to be sealed into a cathode ray tube funnel portion formed in said cavity. An anode button is supported on said upper end of the mandrel, a gob of molten glass is supplied to said forming cavity and at least one of said members is moved towards the other of such members in a press forming operation. During such movement the plunger member first contacts the upper end of said button and then moves said mandrel downwardly through said hole in the mold member. The plunger subsequently causes said molten glass to flow outwardly and upwardly in said forming cavity and the peripheral surface of the anode button is subsequently surrounded by such glass to become hermetically sealed in the wall of said funnel portion formed by the press forming operation.

Brief description of the drawings

In the drawings:

FIG. 1 comprises several cross-sectional views of a glass forming mold and cooperative overlying pressing plunger and illustrates several steps in forming a cathode ray tube funnel portion in accordance with the invention;

FIG. 2 is a cross-sectional view of a funnel portion with an anode button which has been sealed in the wall of such portion during the press forming thereof in accordance with the invention; and FIG. 3 is an enlarged cross-sectional view of the upper end of said mandrel employed in practicing the invention and illustrates the manner in which the usual anode button is supported on such end of the mandrel.

Similar reference characters refer to similar parts in each of the views of the drawings.

Description of the preferred embodiment

Referring to FIG. 1 of the drawings, there is shown in cross-section, for ease of understanding of the invention, a pair of glass forming members including a mold member 10 embodying a glass forming cavity 10a having a configuration desired for funnel portions of cathode ray tubes to be formed, and a pressing plunger member 11. The usual operating rod 12 is shown attached to the top of plunger 11. Mold member 10 embodies a hole 10b extending through the mold in substantially a vertical direction and opening into said mold cavity 10a. Hole 10b has a cross-sectional configuration substantially corresponding to that of anode buttons to be sealed into the walls of said funnel portions of said cathode ray tubes.

A mandrel 13 is provided in and extends through hole 10b, such mandrel having a cross-sectional configuration corresponding to that of such hole and fitting snugly therein. The upper end of mandrel 13 normally extends above the glass forming surface of cavity 10a in mold member 10 for a selected distance and said upper end has a configuration such that an anode button 14, may be supported thereon in a relatively firm but removable relationship therewith and in the attitude substantially at which such anode button is to be sealed in the wall of one of said funnel portions. Mandrel 13 fits snugly in hole 10b, as mentioned, but is slidably vertically movable therein. However, at least the downward sliding movement of mandrel 13 within hole 10b is resistively opposed. This may be accomplished by an extra close fit of mandrel 13 in hole 10b but it is preferred to exert an upward force on the lower end of mandrel 13 to make the mandrel resistively slidable only in the downward direction in said hole. For such purpose the lower end of mandrel 13 may, for example, be attached to the end of a piston rod of a suitable reciprocative pressurized fluid motor as is well known in the art. However, the specific means per se for making mandrel 13 resistively slidable at least in its downward movement within hole 10b forms no part of the present invention and, therefore, said means are not shown in the drawings. As mentioned, no such means need necessarily be provided since resistivity to said sliding movement of mandrel 13 can be attained by the fit of the mandrel within hole 10b.

As best illustrated in FIG. 3 and as previously mentioned, the upper end of mandrel 13 has a configuration such as to firmly but removably support an anode button, such as 14, on the upper end thereof and in an attitude corresponding to the attitude at which such button is to be sealed in the wall of a cathode ray tube funnel portion. Anode buttons in use today are generally provided with a concavity for the purpose of receiving, in a snap-in or plug-in relationship therewith, the end of an electrical cable or conductor for supplying electrical power to said anode button and thence to a conductive coating provided on the inner surface of the cathode ray tube in which said button is employed, as is well known in the art. Accordingly, the upper end of mandrel 13 is illustrated in FIG. 3 as being provided with a short projection 13a of a smaller diameter than the rest of the mandrel, such portion being intended to fit snugly, as also shown in FIG. 3, within said concavity of the type of anode buttons currently in general use. However, if an anode button of a different type than that in general use is to be used, the upper end of mandrel 13 is accordingly shaped or otherwise adapted to temporarily support such type of button. It is further pointed out that, if found desirable or expedient to do so, additional means can be provided for additionally supporting an anode button on the upper end of mandrel 13. As an example, mandrel 13 can be provided with a vacuum passage extending longitudinally therethrough and opening through the upper end of such mandrel, vacuum being supplied at the lower end of such passage, in any of the well known manners, to in turn supply vacuum at said opening in the upper end of the mandrel and to an anode button disposed on such end.

In practicing the method of the present invention, mandrel 13 is arranged in hole 10b so as to project into cavity 10a of mold 10 with the upper end thereof a distance above the glass forming surface of such cavity as shown in step 1. As previously mentioned, mandrel 13 is held in said position in hole 10b by a force resisting the movement of the mandrel downwardly through such hole. An anode button is positioned on the upper end of mandrel 13 as shown in FIG. 1 and, if such anode button is the type generally in current use, as illustrated in more detail in FIG. 3. It will be noted that anode button 14 is supported on said short projection 13a on the upper end of mandrel 13 in substantially the same attitude at which it is to be sealed into the wall of cathode ray tube funnel portion.

A gob of molten glass 15 is supplied to forming cavity 10a in mold member 10 for press forming by pressing plunger 11. Accordingly, at least one of such members is moved toward the other thereof to perform such pressing. Plunger 11 may, for example, be moved downwardly toward mold 10 by operating rod 12. An area on the forming surface of plunger 11 first contacts the upper end of anode button 14 during said downward movement of such plunger as illustrated in step 2 of FIG. 1 and, during further similar movement of at least one of said members toward the other, mandrel 13 is moved downwardly through hole 10b in mold 10. The gob of molten glass 15 is subsequently contacted by plunger 11 and such glass is forced to flow outwardly and upwardly in mold cavity 10a to surround an upper portion of mandrel 13 and the peripheral surface of anode button 14 supported on the top of said mandrel as shown in step 3 of FIG. 1. During the latter part of the press forming operation, mandrel 13, as illustrated in step 4 of FIG. 1, has been moved downwardly through hole 10b in mold member 10 so that only said peripheral surface of anode button 14 is surrounded by the molten glass and such glass is pressed into intimate contact with said peripheral surface to form hermetic seal between such surface and the surrounding glass. The upper and lower ends of button 14 are, however, not contacted by the glass at any time during the pressing operation and, therefore, are left exposed following such operation.

After the formed glass in mold cavity 10a cools sufficiently to become set up, members 10 and 11 are separated to their positions shown in step 1 and the formed cathode ray tube funnel portion 16, shown in FIG. 2 of the drawings and including the anode button such as 14 hermetically sealed in the wall thereof, is removed from mold cavity 10a. The apparatus, following the return of mandrel 13 to its raised position within hole 10b in mold 10, is then in condition to press form another cathode ray tube funnel portion 16 with an anode button such as 14 sealed therein.

It has at times been found expedient, for optimum sealing, to supplementally heat the anode buttons, that is, to supply heating thereof over and above that which takes place by the transfer of heat from the molten glass to such buttons. This can be done either prior to the placing of the buttons on the upper end of the mandrel such as 13 or subsequent to such disposition of the buttons but prior to the pressing of the gob of molten glass. Such heating can be done, of course, in any convenient manner such as by a suitable torch, etc. Furthermore, if found expedient to do so, each button can be electrically heated in a manner similar to that disclosed in copending application, Ser. No. 662,148 filed Aug. 21, 1967, now abandoned, by Meryle D. W. Adler, Charles R. Michaels and Lawrence A. Pauls, such application being assigned to the same assignee as the present application. By using such electrical heating, the anode buttons can be initially heated prior to the press forming operation or can be electrically heated at any time during such operation.

What is claimed is:

1. In the pressing of a glass cathode ray tube funnel portion by glass pressing apparatus comprising a mold member including a forming cavity and a cooperative overlying pressing plunger member, the method of forming said funnel portion with the peripheral surface of an anode button extending through and hermetically sealed in the wall of such funnel portion and with the surfaces of the ends of such button exposed, such method comprising,
  (a) providing a hole in said mold member extending substantially vertically through such mold member and opening into said forming cavity at a location corresponding to the part of said wall of said funnel portion in which said anode button is to be sealed, said hole having a cross-sectional configuration substantially corresponding to that of said anode button;
  (b) inserting through said hole a mandrel fitting snugly and resistively slidable therein at least in the downward direction, and extending into said forming cavity of said mold member a selected distance above the glass forming surface of such member, the upper end of said mandrel having a configuration such as to support said anode button on such end substantially in the attitude at which such button is to be sealed in said wall of said funnel portion;
  (c) supporting said anode button on said upper end of said mandrel in said attitude;
  (d) supplying a gob of molten glass to said forming cavity;
  (e) moving at least one of said members toward the other of said members to cause the glass forming surface of said plunger to first contact the exposed upper end of said anode button and, during further similar movement of at least one of said members to move said mandrel downwardly through said hole and subsequently press said gob of molten glass to form said funnel portion, such molten glass flowing about and intimately surrounding said peripheral surface of said anode button to provide a hermetic seal between such surface of the button and the pressed glass; and
  (f) following said press forming of said funnel portion and sufficient cooling of the glass to cause the pressed form of such funnel portion to become set up, removing the funnel portion from said forming cavity with the peripheral surface of said anode button hermetically sealed in said portion and with the ends of such button exposed.

2. The method in accordance with claim 1 and in which the volume of said gob of molten glass and the location of said hole are such that, during a first stage of said pressing of said gob, the molten glass flows about and surrounds said mandrel during said downward movement of the mandrel and, during a later stage of said pressing, the molten glass intimately surrounds said peripheral surface of said anode button to provide said hermetic seal.

3. The method in accordance with claim 1 and in which said anode button is supplementally heated for sealing in the glass of said funnel portion.

4. The method in accordance with claim 2 and in which said anode button is supplementally heated for sealing in the glass of said funnel portion.

References Cited

UNITED STATES PATENTS

| | | | |
|---|---|---|---|
| 3,004,182 | 10/1961 | Pfaender | 65—59 |
| 3,088,299 | 5/1963 | McMahon | 65—59 |
| 2,315,292 | 3/1943 | Richardson et al. | 65—140 |

S. LEON BASHORE, Primary Examiner

E. R. FREEDMAN, Assistant Examiner

U.S. Cl. X.R.

65—59, 68, 140